(12) United States Patent
Fruzzetti, Jr. et al.

(10) Patent No.: US 7,752,699 B1
(45) Date of Patent: Jul. 13, 2010

(54) TUBING PREPARATION MACHINE

(76) Inventors: Francis Paul Fruzzetti, Jr., 7783 Applewood Way, Pleasanton, CA (US) 94588; Robert James Frerking, 12450 Del Valle Rd., Livermore, CA (US) 94550

( * ) Notice: Subject to any disclaimer, the term of this patent is extended or adjusted under 35 U.S.C. 154(b) by 1025 days.

(21) Appl. No.: 11/150,800

(22) Filed: Jun. 10, 2005

Related U.S. Application Data

(60) Provisional application No. 60/579,937, filed on Jun. 15, 2004.

(51) Int. Cl.
*B08B 9/02* (2006.01)
*B23D 21/00* (2006.01)

(52) U.S. Cl. .................. 15/88; 15/104.04; 15/104.05; 30/93

(58) Field of Classification Search ............... 15/4, 15/104.03, 104.04, 104.05, 88; 30/93; 3/4
See application file for complete search history.

(56) References Cited

U.S. PATENT DOCUMENTS

| 2,563,483 | A | | 8/1951 | O'Hagan | |
|---|---|---|---|---|---|
| 2,793,473 | A | * | 5/1957 | Hickman | 451/65 |
| 3,027,688 | A | * | 4/1962 | Zabransky | 451/65 |
| 3,449,992 | A | | 6/1969 | Hanaway | |
| 3,805,383 | A | | 4/1974 | McNally | |
| 4,173,849 | A | * | 11/1979 | Mar | 451/231 |
| 4,349,928 | A | | 9/1982 | Mlikotin | |
| 4,821,414 | A | | 4/1989 | Ducret | |
| 4,953,377 | A | | 9/1990 | Thorell | |
| 5,142,825 | A | | 9/1992 | Floyd | |
| 5,307,534 | A | | 5/1994 | Miller | |
| 5,493,748 | A | | 2/1996 | Santo | |
| 5,611,146 | A | | 3/1997 | Ducret | |
| 6,009,735 | A | | 1/2000 | Knotek | |
| 6,014,810 | A | | 1/2000 | Earle et al. | |
| 6,122,790 | A | * | 9/2000 | Wambeke | 15/88 |
| 6,336,270 | B1 | | 1/2002 | Dureiko | |
| 6,553,597 | B2 | * | 4/2003 | Anderson | 15/4 |
| 6,553,669 | B2 | | 4/2003 | Carter | |
| 6,581,499 | B2 | * | 6/2003 | Myers | 82/113 |
| 2003/0054738 | A1 | | 3/2003 | Feeley | |

\* cited by examiner

*Primary Examiner*—Randall Chin
(74) *Attorney, Agent, or Firm*—Mark Levy; Hinman, Howard & Kattell

(57) ABSTRACT

A tubing preparation machine is an electrically powered mechanical device housed in one convenient housing assembly. A cutoff assembly is provided that virtually eliminates the need for the reaming and deburring of the cut end of tubing and a cleaner assembly is provided that has a tubing alignment guide to accept tubing to the correct depth for cleaning while stabilizing the tubing during the cleaning process. A quick release chuck allows the operator to easily attach the correct size fitting cleaner brush. The tubing preparation machine is portable, lightweight and easily hand carried by use of a handle provided on the housing assembly cover. The tubing preparation machine provides for unparalleled, safe, convenient and efficient preparation of tubing and related fittings.

12 Claims, 12 Drawing Sheets

TUBING PREPARATION MACHINE

RELATED APPLICATIONS

The present application is a continuation application of U.S. provisional patent application Ser. No. 60/579,937, filed Jun. 15, 2004, by Francis Paul Fruzzetti Jr. and Robert James Frerking, included by reference herein and for which benefit of the priority date is hereby claimed.

FIELD OF THE INVENTION

The present invention relates to the cutting and cleaning of tubing and related fittings in the preparation for joining the components by soldering or other means

BACKGROUND OF THE INVENTION

Tubing and related fittings have been used for piping systems over the years. The preparation and use of tubing and related fittings in any piping system requires that the cutting and subsequent cleaning of the tubing and related fittings be done in a manner to ensure proper assembly to industry standards. In the cutting of the tubing, in many instances, the method of cutting the tubing results in a need for the reaming of the interior of the cut edge of the tubing to return it to its original inside diameter. Depending on the material being cut, the tubing may also require deburring the exterior of the cut edge to return it to its original outside diameter.

The most common method used today for the cutting of tubing and the cleaning of the tubing and fittings requires a time-consuming, laborious and highly repetitive procedure which can result in stress related injury to the operator. This most common method used today also results in higher overall job cost as well as higher job related disability claims.

The most common method used today for cutting tubing is typical of an adjustable mechanical style tubing cutter such as the Ridge Tool Company, Model 15.

The most common method used today for the exterior cleaning of tubing is typically by the use of sand cloth, such the William H. Harvey Company, Item No. 095705.

It is necessary to ream the interior and often to deburr the exterior of the tubing when using the cutting method that typically employs a cutter wheel, such as the Ridgid Model No. E-2558. A method for reaming and deburring of tubing is a hand held tool such as the Ridgid Inner-Outer Reamer No. 227.

The most common method used today for the interior cleaning of fittings is typically by the use of a hand held fitting brush, such as the Oatey Company, Item No. 31328.

In an attempt to improve upon the mechanical style tubing cutter, an abrasive is added to the tubing cutter, which allows the cleaning of the tubing during the cutting process, as illustrated in Published Patent Application No. 20030054738 A1.

Attempts to improve on the method for the cutting and/or cleaning of tubing is illustrated in U.S. Pat. Nos. 3,449,992; 4,349,928; 5,142,825; 6,009,735; 6,014,810; 6,336,270; and 6,553,669, all of which incorporate a power source to assist in the cutting and/or cleaning process.

Another attempt to simplify the cutting and cleaning process is embodied in the Ridge Tool Company, Model 122 Copper Cutting and Prep Machine.

The adjustable mechanical style tubing cutter such as the Ridge Tool Company Model 15, relies upon the physical exertion of the operator, which is labor intensive and over time will result in repetitive stress type disability claims. In addition to being labor intensive, the mechanical method is a slow and time-consuming process.

The use of sand cloth for cleaning the exterior of tubing, such as the William H. Harvey Company, Model No. 095705, also relies upon the physical exertion of the operator and results in repetitive stress type injuries and disability claims. In addition to being labor intensive, the use of sand cloth is a slow and time-consuming process.

The use of a hand held tool for the reaming and deburring of tubing, such as the Ridge Tool Company, Model No. 227, and the use of a hand held fitting brush for cleaning the interior of fittings, such as the Oatey Company, Model No. 31328, are subject to the same problems mentioned hereinabove.

The idea of adding an abrasive to the mechanical style tubing cutter, as illustrated in Published Patent Application No. 20030054738 A1, greatly increases the physical exertion required of the operator over the standard mechanical style tubing cutter. The addition of an abrasive to the standard cutter merely compounds the already identified disadvantages of the mechanical style tubing cutter.

The attempts over the years to improve on the method for the cutting and/or cleaning of tubing by using electrically powered cutters and/or cleaners, as illustrated in U.S. Pat. Nos. 3,449,992; 4,349,928; 5,142,825; 6,009,735; 6,014,810; 6,336,270 B1; and 6,553,669 B2, could be considered portable, but they have inherent limitations. Such tools either do not include all of the operations necessary for the preparation of the tubing and related fittings to be joined, or they are cumbersome for the operator to use. As a result they could also cause repetitive stress type injury or disability and could pose a substantial safety hazard to the operator or others in close proximity.

The Ridgid Model 122 Copper Cutting and Prep Machine, manufactured by the Ridge Tool Company, has improved upon some of the above referenced disadvantages. However, the Ridgid Model 122 also has inherent disadvantages: (1) weight of the unit makes portability difficult; (2) usability is restricted because the unit operates only on an alternating current power source; (3) set up of the machine requires that the unit be bolted to a bench (the Operator's Manual states, "failure to place machine on a stable bench may result in tipping and serious injury"); (4) a single on/off switch energizes the motor, which in turn drives the tubing rollers, the tubing cleaner brush, the reamer and the fitting cleaner brush, all moving simultaneously (the Operator's Manual states, "Clothing can be caught in rotating rollers or tools," "Hand or fingers can be cut by rotating reamer," and "Keep electrical cord away from reamer and wire brushes"); (5) the tubing is spinning during the cutting process (the Operator's Manual states, "Do not cut visibly bent tubing" and "Cutting bent tubing will result in excessive vibration, use hand cutter"); (6) since this machine uses a standard cutting wheel, the cut tubing still requires the reaming and deburring process; (7) short pieces of tubing cannot be safely cleaned by the operator because of the exposed wire wheel and the close proximity of the operator's hands to the wire wheel. This same concern applies to the reaming operation.

It is therefore an object of the invention to provide a lightweight, highly portable, tubing preparation machine that requires little or no setup time.

It is another object of the invention to provide a safe, fast and accurate cutting process of tubing, which requires no reaming or deburring of the cut end of the tubing, and only minimal effort on the part of the operator, resulting in less physical fatigue to the operator and higher productivity.

It is another object of the invention to provide a safe, fast and thorough cleaning process of tubing and fittings, requiring minimal effort on the part of the operator.

It is another object of the invention to have the capability of cleaning various size tubing and fittings with the ability to reverse the rotation of the cleaning brushes and therefore substantially increase the life expectancy of the cleaner brushes.

SUMMARY OF THE INVENTION

In accordance with the present invention, a tubing preparation machine is provided for the cutting and cleaning of tubing and related fittings which substantially reduces the time and physical effort required by the operator to accomplish this task. The present invention is an electrically powered (i.e., alternating current or direct current) mechanical device which provides for the cutting and cleaning of tubing and related fittings all located in one convenient and portable housing assembly. The housing assembly contains a cutoff assembly that virtually eliminates the need for the reaming and deburring of the cut end of the tubing. A cleaner assembly is also provided that has a tubing alignment guide with a concave relief and integral tubing alignment guide reliefs that accept the tubing to the correct depth for cleaning while stabilizing the tubing during the cleaning process. A quick release chuck allows the operator to easily attach the correct size fitting cleaner brush. The present invention is portable, lightweight and easily hand carried by the operator to the work site by use of a handle provided on the housing assembly cover.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
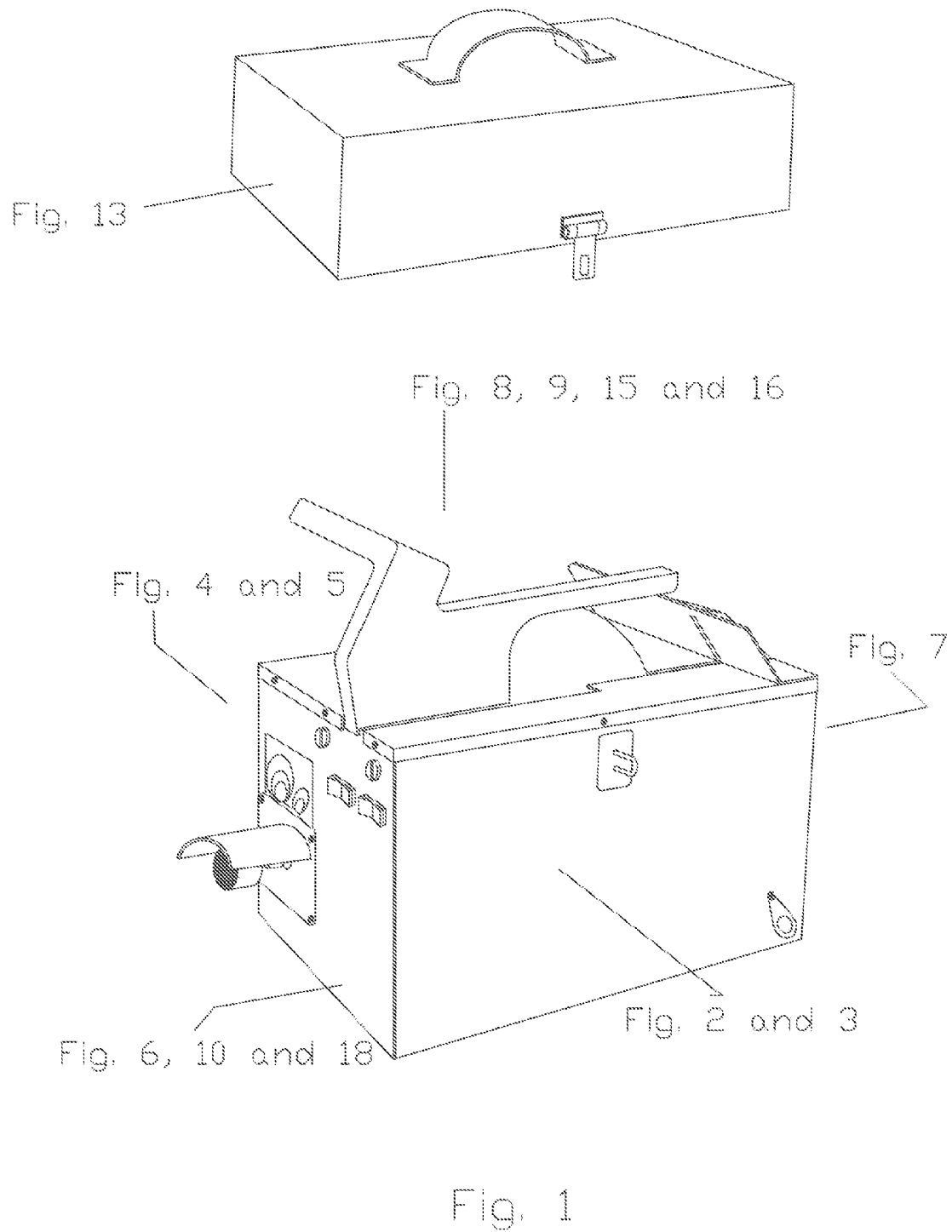
FIG. 1 is a perspective view of an embodiment of the present invention.

FIG. 1 is a perspective view of an embodiment of the present invention, a tubing preparation machine 300.

FIGS. 2, 3, 4 and 5 are, respectively, right and left side cut away views of an embodiment of the present invention showing the relative position of the components comprising the cutoff assembly 100 and the cleaner assembly 200.

Figure 2:
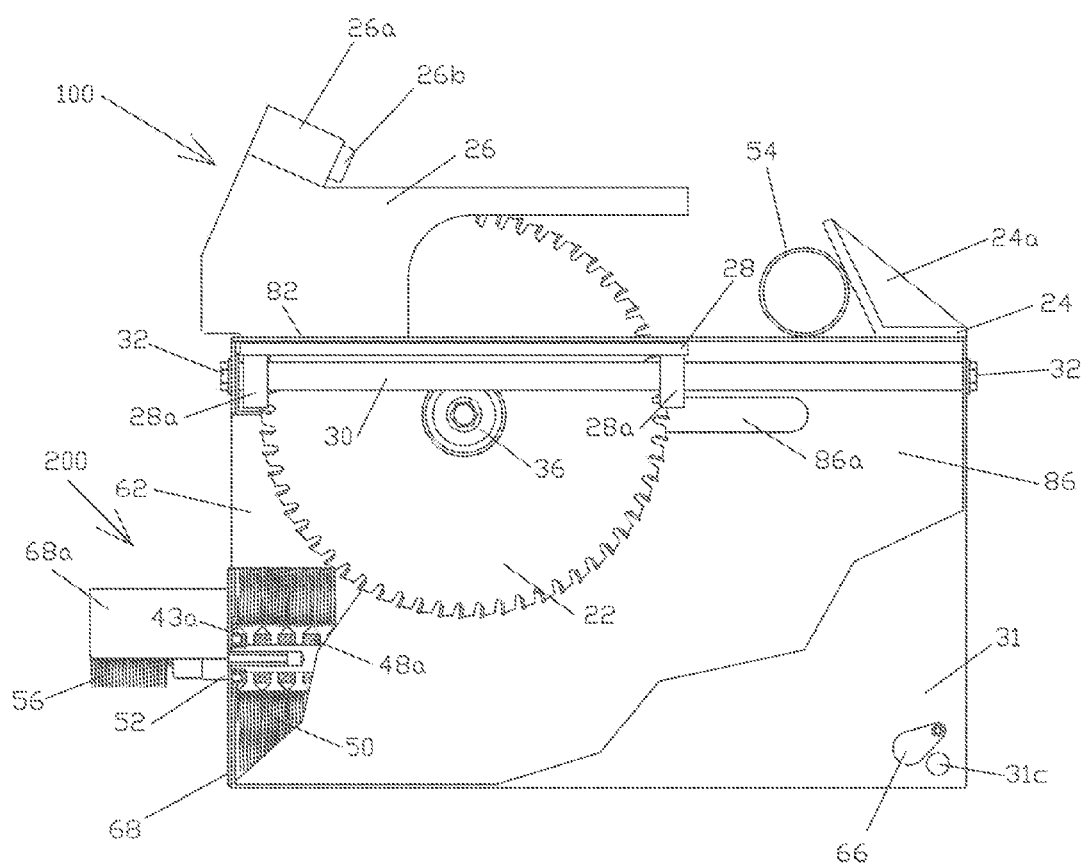
FIG. 2 is a right side cut away view of an embodiment of the present invention showing the relative position of internal components while in the initial position.
Figure 3:
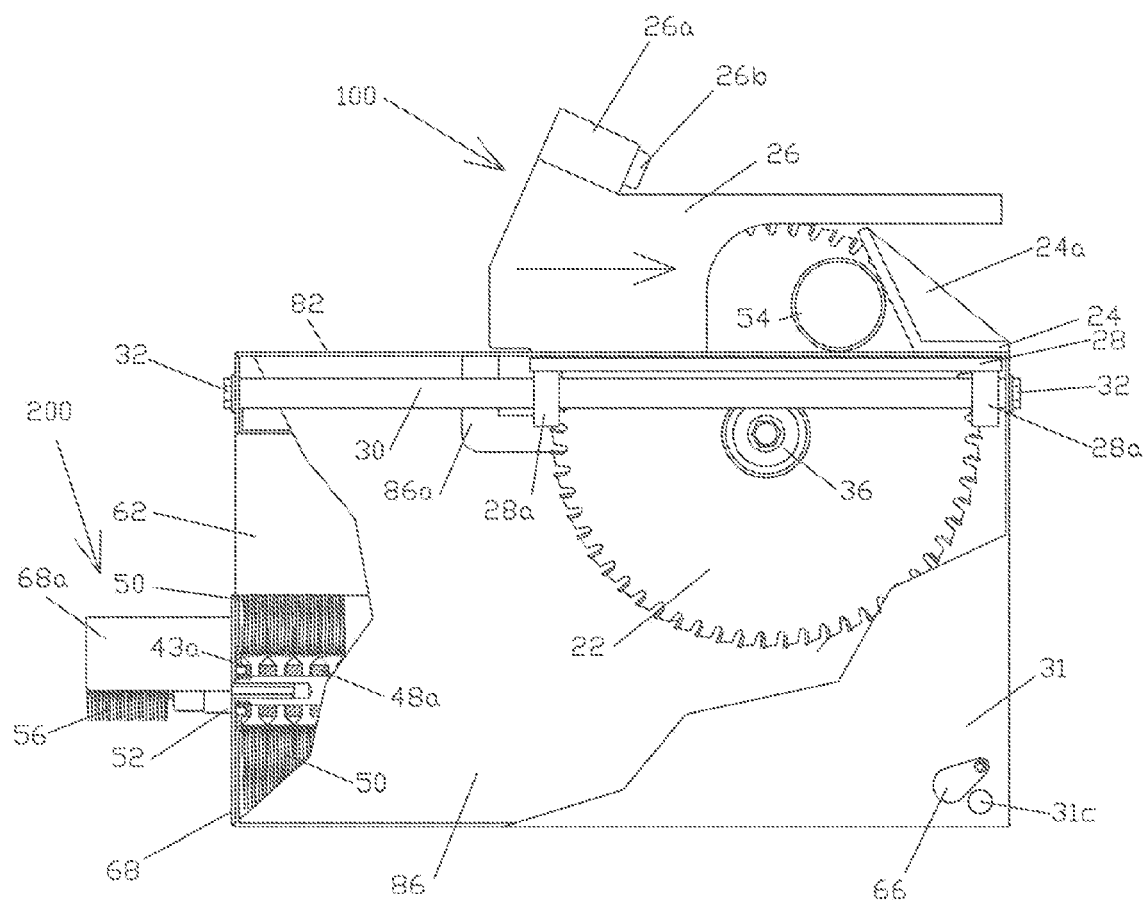
FIG. 3 is a right side cut away view of an embodiment of the present invention showing the relative positions of internal components while in the forward moved position.
Figure 4:
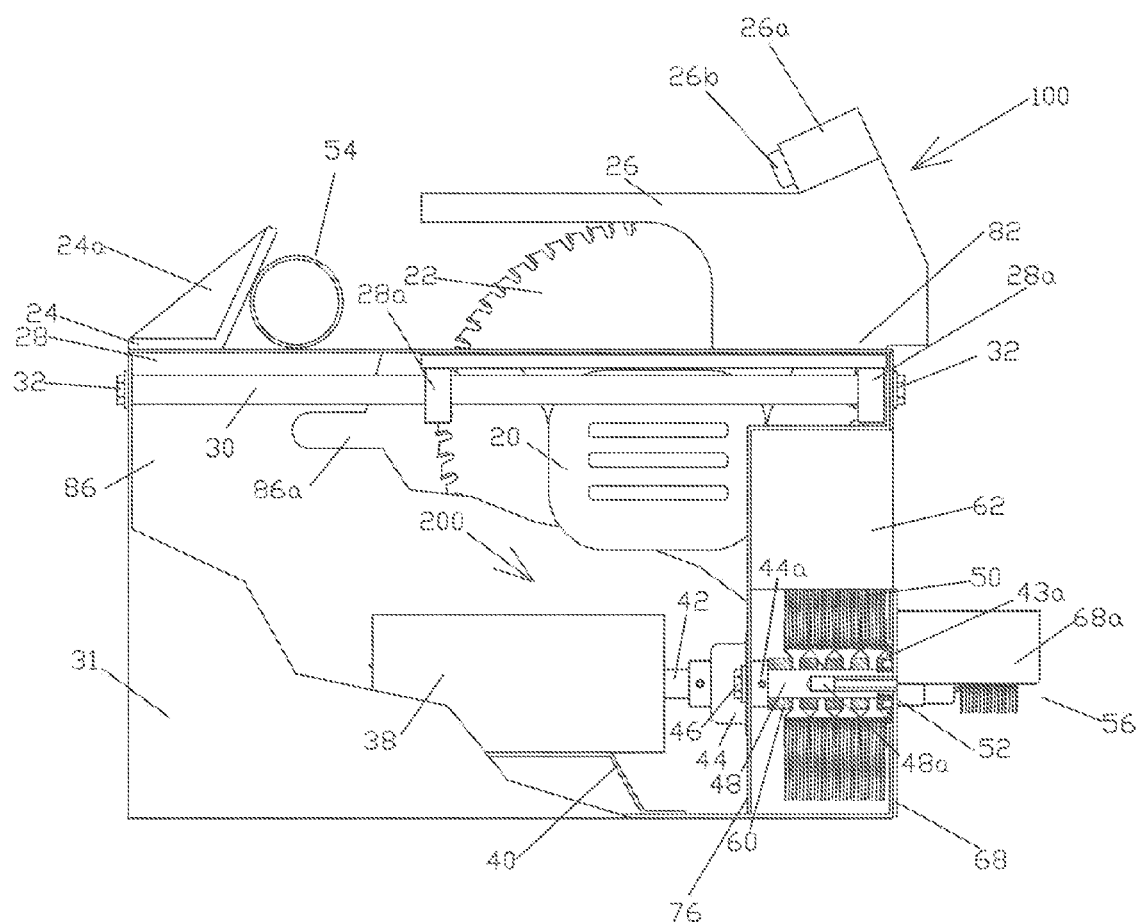
FIG. 4 is a left side cut away view of an embodiment of the present invention showing the relative position of internal components while in the initial position.

Referring now to FIG. 2, the cutoff assembly 100 is comprised of a base plate 28 which is fabricated of metal, plastic or other suitable material, having a base plate relief 28b to accommodate a circular cutoff blade 22. Circular cutoff blade 22 has peripheral chamfer cutting teeth 23 which are fabricated of tungsten carbide or other suitable material for cutting ferrous, nonferrous and other materials.

A guide rail sleeve 28a which is fabricated of metal, plastic or other suitable material is affixed by weld or other suitable method to the underside of the base plate 28. The guide rail sleeve 28a is positioned on the underside of the base plate 28 at opposing corners and in parallel alignment. The guide rail sleeve 28a is designed for and positioned on the base plate 28 to receive a guide rail 30, which is fabricated of metal, plastic or other suitable material, and are placed in parallel with each other, allowing the cutoff assembly 100 to move from the initial position in a forward direction then backward direction along the parallel placed guide rail 30 in the process of cutting tubing 54. The guide rail 30 is removably affixed by means of a guide rail fastener 32 to the interior of a housing assembly 31, which is fabricated of metal, plastic or other suitable material. Housing assembly 31 has a chip cleanout port 31c with a chip cleanout cover 66 which is fabricated of metal, plastic or other suitable material and is movably affixed to the housing assembly 31, covering the chip cleanout port 31c.

A cutoff motor 20 (FIG. 4) is typical of a circular saw motor, such as the Milwaukee 6391-21 or other suitable motor type, with either an alternating current or a direct current power source, not shown, is mounted to the base plate 28 with the orientation of the cutoff motor 20 being perpendicular to the base plate relief 28b and guide rail 30. The orientation of the cutoff motor 20 to the base plate 28 allows the cutoff blade 22 to pass unobstructed through the base plate relief 28b when the cutoff blade 22 is attached to a cutoff motor shaft 34 by use of a cutoff blade retainer 36, which is fabricated of metal or other suitable material. A cutoff blade guard 26, which is fabricated of metal, plastic or other suitable material is affixed by weld or other suitable method to a cutoff apparatus hand grip 26a, which is fabricated of metal or other suitable material.

A cutoff motor control device 26b, which is typical of a grip or button type "deadman's" switch that is activated by depressing the switch and deactivated by releasing the switch, is located within the cutoff apparatus hand grip 26a. The cutoff blade guard 26 is affixed by weld or other suitable method to the top side of the base plate 28 in such a way that it is set parallel to and centered directly over the base plate relief 28b.

A tubing fence 24 which is fabricated of metal, plastic or other suitable material, is affixed by weld or other suitable method to the top back edge of a housing assembly top 82 (FIG. 4), which is fabricated of metal, plastic or other suitable material.

The tubing fence 24 is aligned perpendicular to the cutoff blade 22. The housing assembly top 82 is attached to the housing assembly 31 by means of a suitable fastener 82b for housing assembly top 82. The housing assembly top 82 is attached to the housing assembly 31, housing assembly top relief 82a allows the cutoff blade 22 to pass parallel to and unobstructed through the housing assembly top relief 82a during the cutting process.

A chip deflector 24a, which is fabricated of metal, plastic or other suitable material, is hollow, and is affixed by weld or other suitable method to the tubing fence 24 so as to receive unobstructed the cutoff blade 22 in its most forward position.

A housing assembly cover 78, which is fabricated of metal, plastic or other suitable material, is removably affixed to the housing assembly 31 by means of a latch 78a and latch receiver 78b. The housing assembly cover 78 provides protection of the exposed components of the cutting assembly during transport. In addition, the housing assembly cover 78 has storage capability for parts and accessories.

The cleaner assembly 200 is comprised of a cleaner motor 38, such as a hand held reversible rotation drill motor with an integral gear box, such as the Milwaukee 0235-21, or other suitable motor type with gear reduction. Cleaner motor 38 is powered by either an alternating current or direct current power source, not shown. The cleaner motor 38 is mechanically affixed to a cleaner motor mount 40, which is fabricated of metal, plastic or other suitable material is affixed by weld or other suitable method within the housing assembly 31. A cleaner mounting bracket 76 which is fabricated of metal, plastic or other suitable material is affixed by weld or other suitable method within the housing assembly 31 to support the cleaner assembly 200.

A cleaner motor shaft 42, having male threads on the outboard end, passes through a cleaner shaft support 44, which is typical of a flange type bearing. Cleaner shaft support 44 is affixed to the cleaner mounting bracket 76 by a cleaner shaft support retainer 46.

An adaptor shaft 48, which is fabricated of metal, plastic or other suitable material, has female threads on the input end and male threads on the output end, with an adaptor shaft relief 48a located in the output end. The adaptor shaft relief 48a has a bore diameter and depth of sufficient dimensions to receive a quick release chuck 52 shank, such as Milwaukee Electric Tool Corporation catalog number 48-03-0005 or equivalent. The input female thread end of the adaptor shaft 48 is connected to the male threaded output end of the cleaner motor shaft 42 by screwing the two pieces together and locking them in place with a set screw 44a. A spacer 60, which is fabricated of metal, plastic or other suitable material is installed over the adaptor shaft 48, followed by the placement of an exterior tubing cleaner 50 (e.g., Milwaukee Brush number 08063), followed by the placement of another spacer 60 and another exterior tubing cleaner 50 until the desired overall width of the exterior tubing cleaner 50 is obtained.

An exterior tubing cleaner retainer 43a is installed over the male threaded outboard end of the adaptor shaft 48 and must be tightened adequately to prevent any movement between the adaptor shaft 48, the spacer 60 and the exterior tubing cleaner 50. An interior fitting cleaner 56, such as Ridgid Catalog No. 93722 or equivalent, is sized appropriately for the related fitting to be cleaned, and is removably installed in the quick release chuck 52. A cleaner cover plate 68 (FIG. 6) which is fabricated of metal, plastic or other suitable material, is permanently affixed by weld or other suitable method, to a safety guard 68a, which is fabricated of metal, plastic or other suitable material and is located directly over the quick release chuck 52. A cleaner cover plate 68 is removably affixed to the housing assembly 31 by means of a retainer 70 for cleaner cover plate 68.

Figure 6:
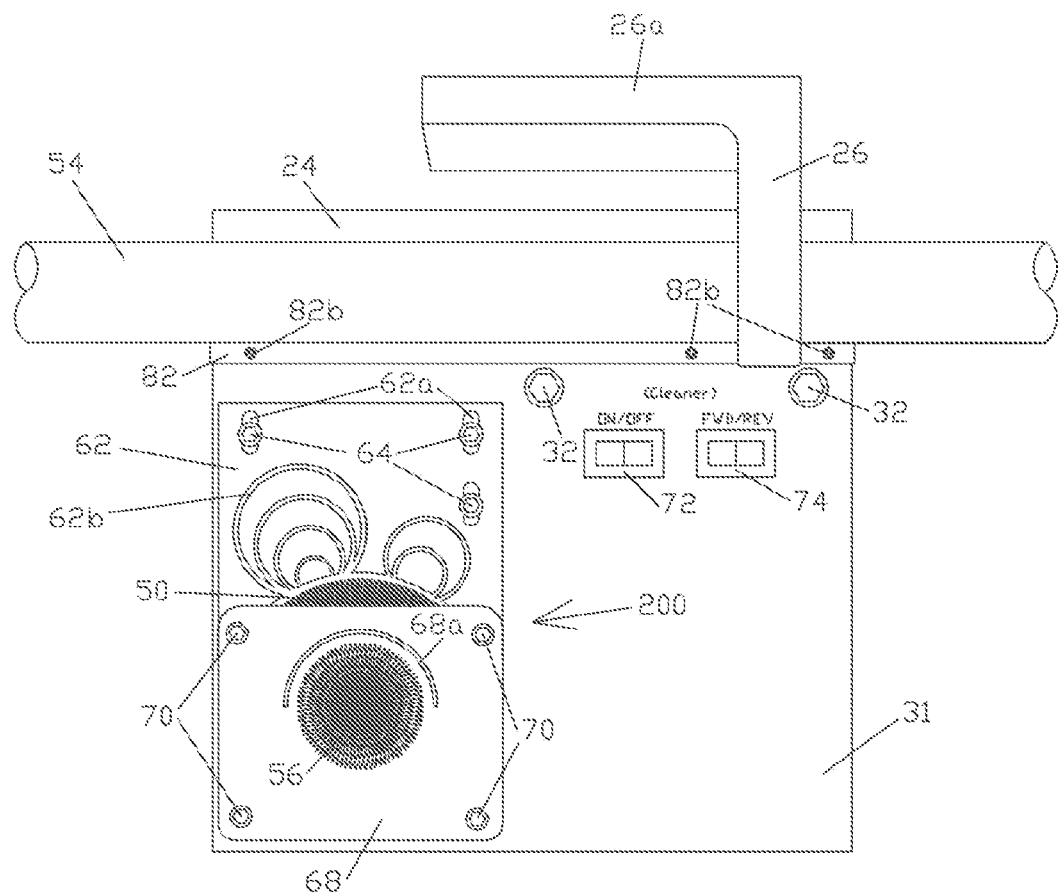
FIG. 6 is a front view of an embodiment of the present invention showing the relative position of the tubing alignment guide, the exterior tubing cleaner, the interior fitting cleaner, the cleaner motor control device and the cleaner motor directional control device.

Referring now also to FIG. 6, there is shown a front view of an embodiment of the present invention showing the relative position of the tubing alignment guide 62 which is fabricated of metal, plastic or other suitable material. A series of tubing alignment guide relief 62b (FIGS. 10, 11 and 12) is provided, each tubing alignment guide relief 62b having a predetermined depth and width to accommodate specific size tubing 54 with various wall thicknesses. Each tubing alignment guide relief 62b is arranged on the tubing alignment guide 62 so as to be of equal distance from the center of the adaptor shaft 48 to the closest point on their external circumferences to accept various size tubing 54 at predetermined depths.

The tubing alignment guide 62 is adjustably affixed to a cleaner mounting bracket 76 (FIG. 4) by using an alignment guide retainer 64 which is placed through the tubing alignment guide adjustment relief 62a. The tubing alignment guide adjustment relief 62a allows for any adjustment needed to maintain the proper clearance between the tubing alignment guide 62 and the exterior tubing cleaner 50.

Figure 5:
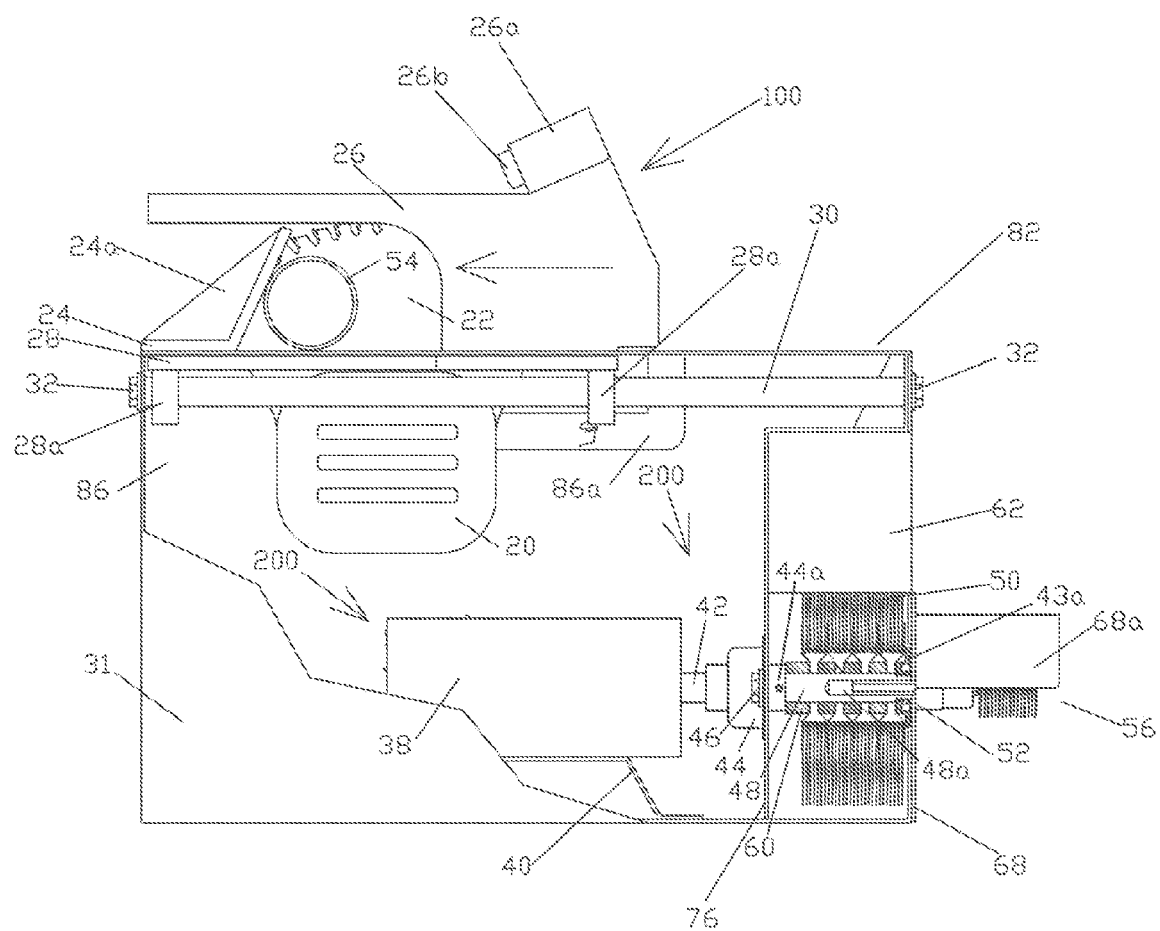
FIG. 5 is a left side cut away view of an embodiment of the present invention showing the relative positions of internal components while in the forward moved position.

A cleaner motor control device 72 and a cleaner motor directional control device 74, which are typical of a two position electrical rocker switch or equivalent, are removably affixed into switch cutout 31b located in the housing assembly 31, and are electrically connected in series between the power source, not shown, and the cleaner motor 38. The cleaner cover plate 68 (FIG. 18) having a safety guard 68a, is installed over the quick release chuck 52 (FIG. 5). The cleaner cover plate 68 is removably affixed to housing assembly 31 by means of the retainer for cleaner cover plate 70.

Figure 7:
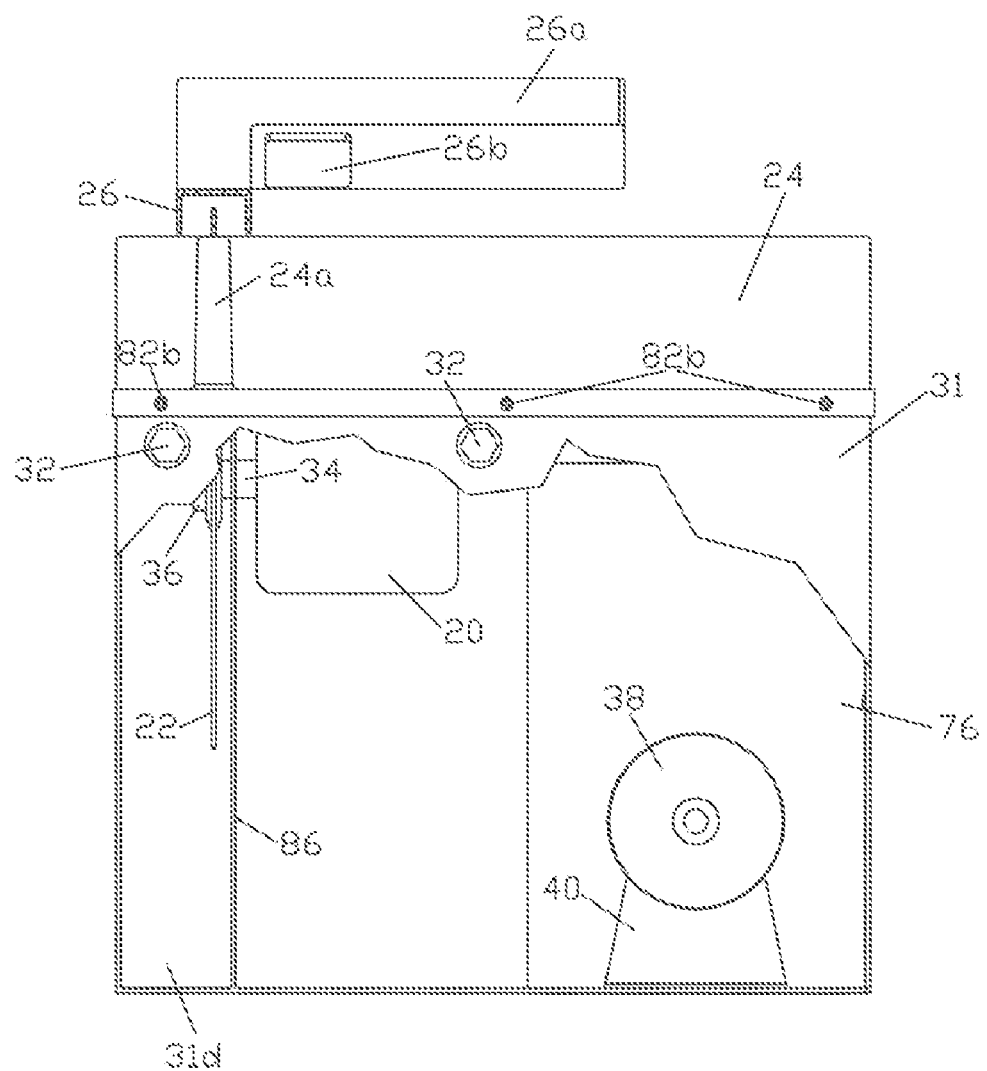
FIG. 7 is a rear cut away view of an embodiment of the present invention showing the relative position of internal components.

Referring now also to FIG. 7, there is shown a rear cutaway view of an embodiment of the present invention having a housing assembly partition 86, which is fabricated of metal, plastic or other suitable material and is permanently affixed by weld or other suitable method within the housing assembly 31. The placement relationship is shown of the housing assembly partition 86, the cutoff motor 20, the cutoff motor shaft 34 and the cutoff blade 22.

Figure 8:
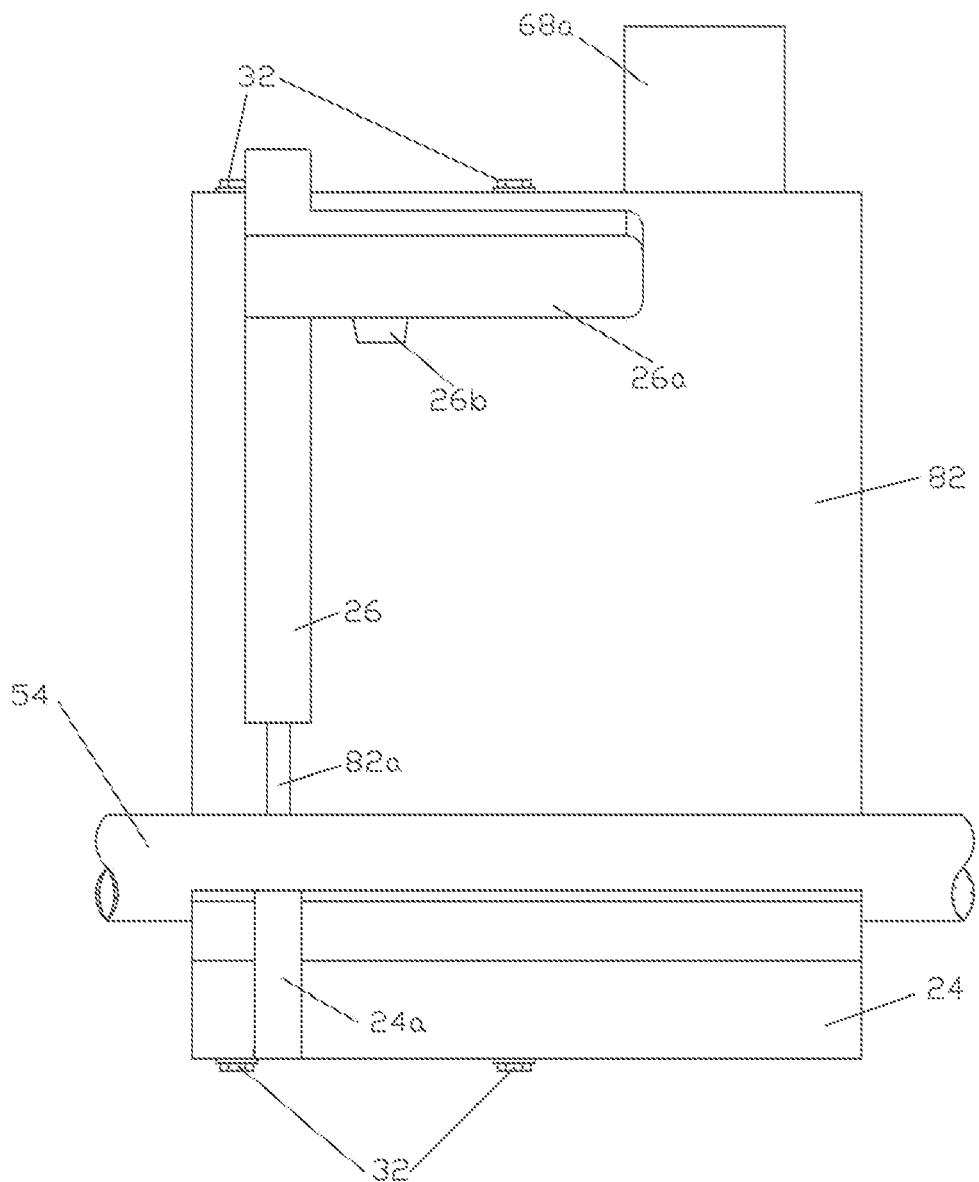
FIG. 8 is a top view of an embodiment of the present invention showing the cutoff assembly in the initial position.

FIG. 8 is a top view of an embodiment of the present invention showing the cutoff assembly 100 in the initial position.

Figure 9:
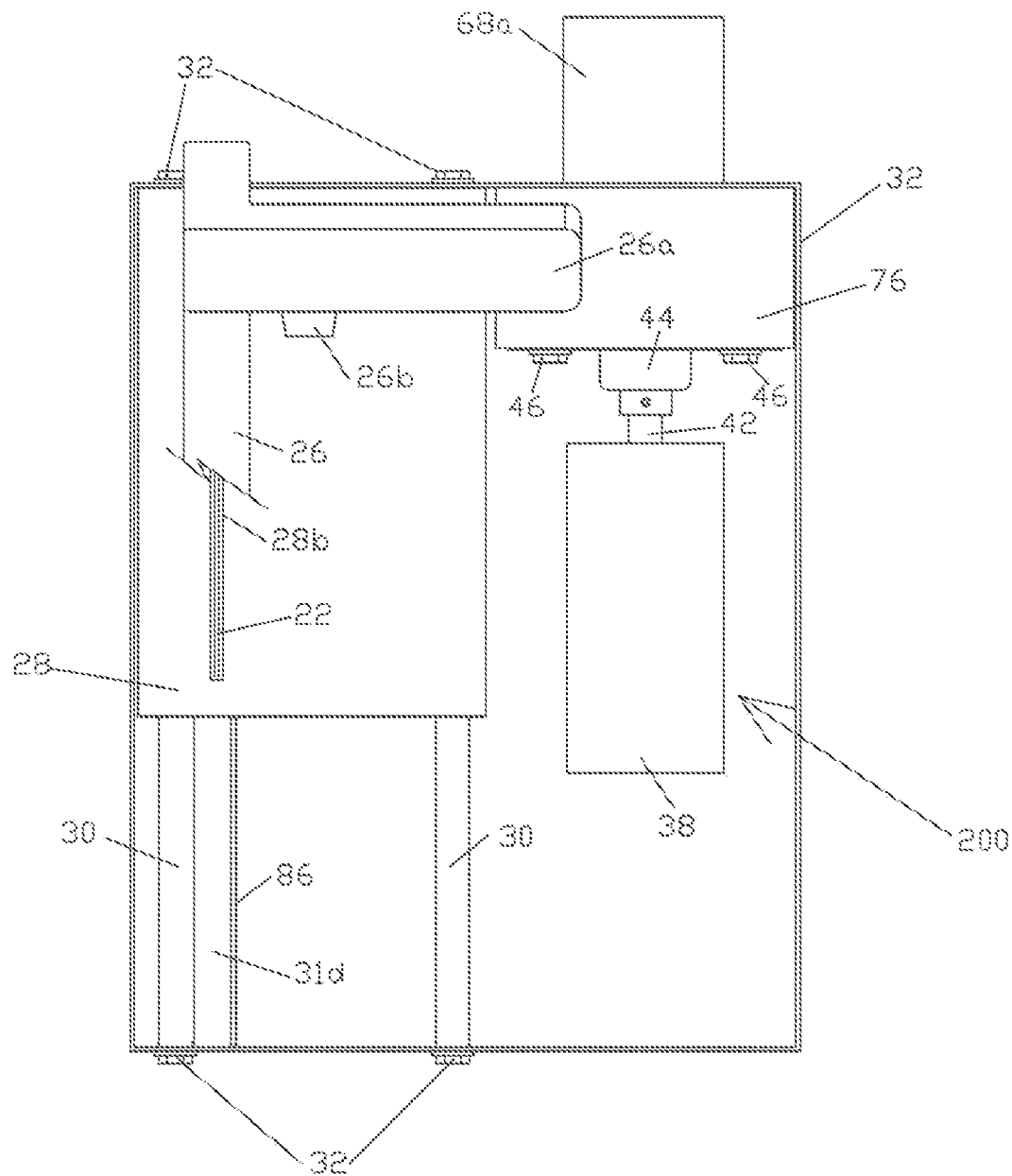
FIG. 9 is a top view of an embodiment of the present invention with the cutoff assembly in the initial position, with housing assembly top removed, showing the relative position of the internal components.

FIG. 9 is a top view of an embodiment of the present invention with the cutoff assembly 100 in the initial position, with a portion of the cutoff blade guard 26 removed and the housing assembly top 82 removed, showing the placement relationship of the base plate 28, the guide rail 30, the housing assembly partition 86 and the cleaner assembly 200 within the housing assembly 31.

Figure 10:
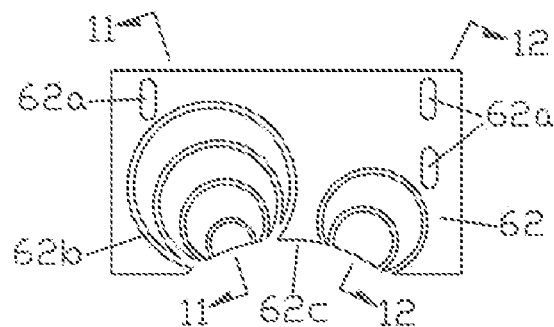
FIG. 10 is a front view of an embodiment of the present invention of the tubing alignment guide.

FIG. 10 is a front view of an embodiment of the present invention of the tubing alignment guide 62, showing the tubing alignment guide adjustment relief 62a, the tubing alignment guide relief 62b and a concave relief 62c.

Figure 11:
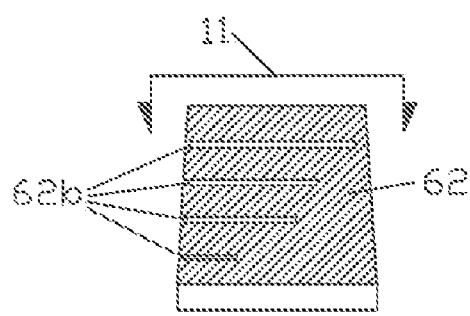
FIG. 11 is a cross sectional view of an embodiment of the present invention of the tubing alignment guide representing the left side of the tubing alignment guide shown in FIG. 10.
Figure 12:
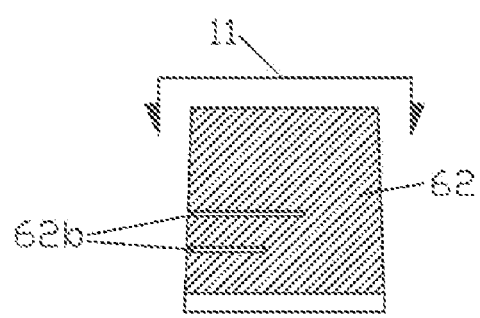
FIG. 12 is a cross sectional view of an embodiment of the present invention of the tubing alignment guide representing the right side of the tubing alignment guide shown in FIG. 10.

FIGS. 11 and 12 are cross sectional views of an embodiment of the present invention of the tubing alignment guide 62 showing the predetermined depths of the various tubing alignment guide relief 62b to accommodate various size (i.e., diameter) tubing 54.

Figure 13:
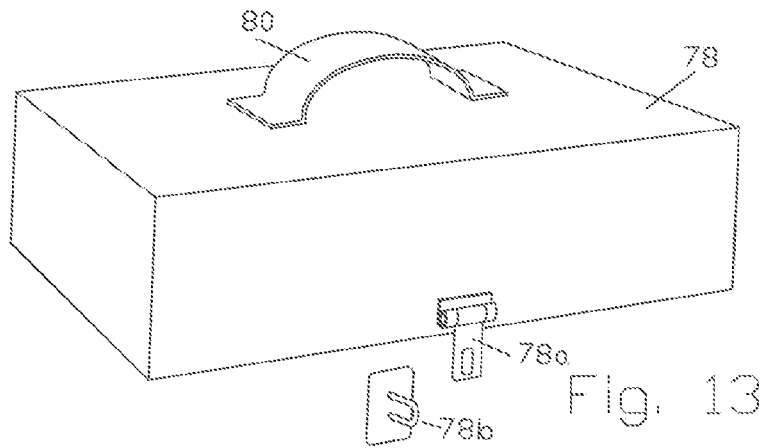
FIG. 13 is a perspective view of an embodiment of the present invention of the housing assembly cover with housing cover handle.

FIG. 13 is a perspective view of an embodiment of the housing assembly cover 78, with a housing cover handle 80, which is fabricated of metal, plastic or other suitable material, affixed by weld or other suitable method to the top of the housing assembly cover 78. The housing cover handle 80 facilitates easy portability of the tubing preparation machine 300. A latch 78a which is fabricated of metal, plastic or other suitable material is affixed by weld or other suitable method to the housing assembly cover 78 at appropriate locations. A latch receiver 78b which is fabricated of metal, plastic or other suitable material is affixed by weld or other suitable method to the housing assembly 31 at appropriate locations to correspond to the locations of each latch 78a on the housing assembly cover 78.

Figure 14:
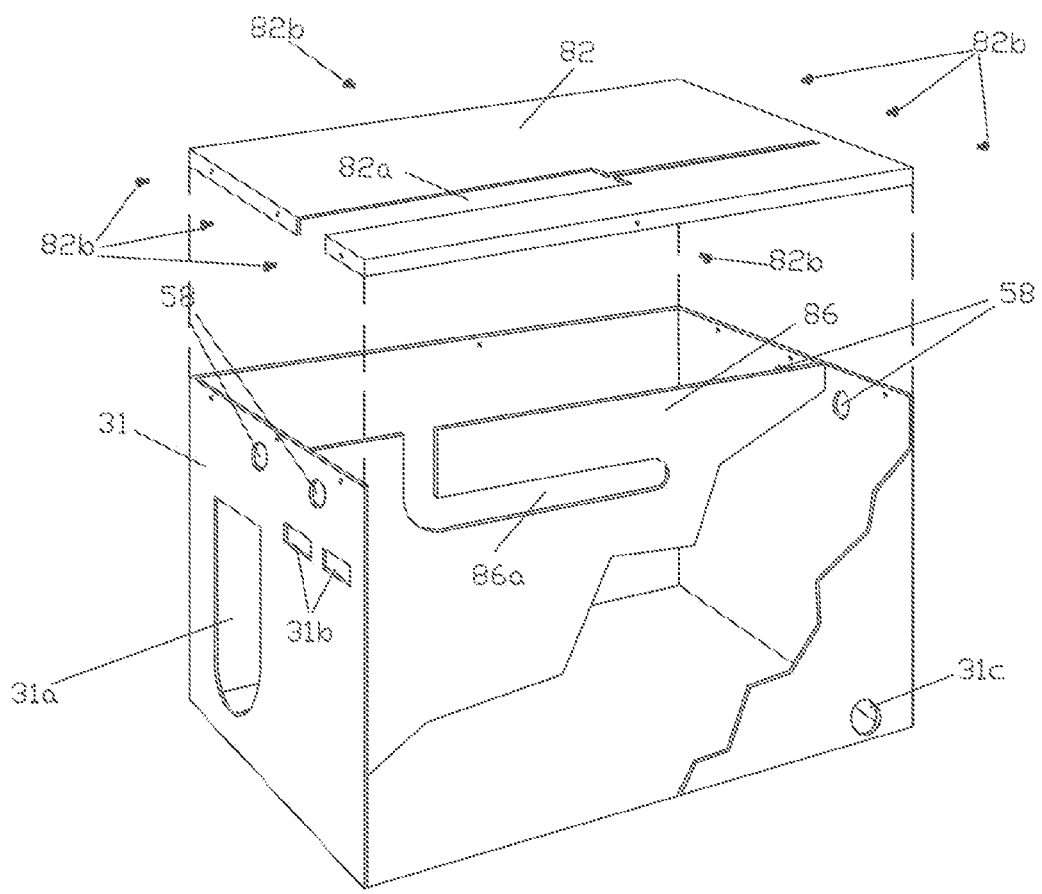
FIG. 14 is a perspective cutaway view of an embodiment of the present invention of the cutaway of the housing assembly with housing assembly top.

FIG. 14 is a perspective cutaway view of an embodiment of the housing assembly 31, the housing assembly partition 86, and the housing assembly top 82. The housing assembly 31 has a cleaner cutout 31a for the cleaner assembly 200, a dual switch cutout 31b for the cleaner motor control device 72 and the cleaner motor directional control device 74, and a chip cleanout port 31c. The housing assembly 31 has circular openings 58 of sufficient size and number to accommodate the guide rail fastener 32. The housing assembly top 82 has circular openings 58 of sufficient size and number to accommodate affixing the housing assembly top 82 to the housing assembly 31 by use of the fastener for housing assembly top 82b.

Figure 15:
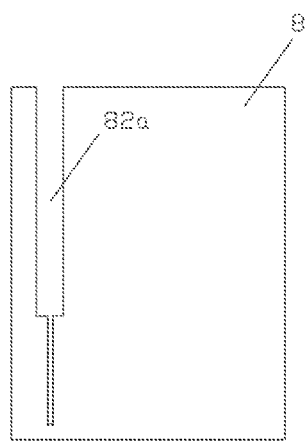
FIG. 15 is a top detail view of an embodiment of the present invention of the housing assembly top.

FIG. 15 is a top detail of the housing assembly top 82 having a 90 degree break along its perimeter (FIG. 14). The 90 degree break is of sufficient width to allow the housing assembly top 82 to be secured to the housing assembly 31 by means of the fastener for housing assembly top 82b.

Figure 16:
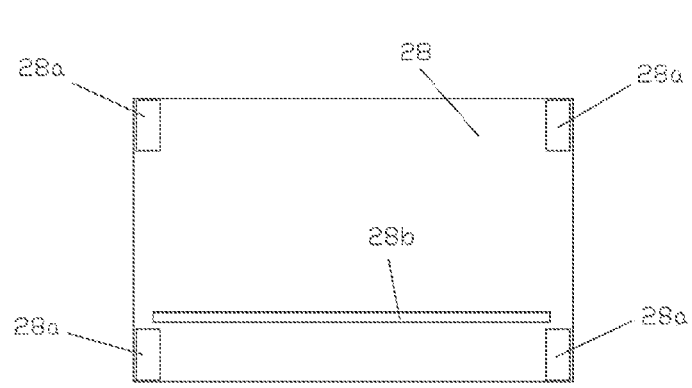
FIG. 16 is a top detail view of an embodiment of the present invention of the base plate for affixing the components which comprise the cutoff assembly.

FIG. 16 is a top detail of the base plate 28 having a base plate relief 28b showing the relative position of the parallel placed guide rail sleeve 28a that is affixed to the underside of the base plate 28.

Figure 17:
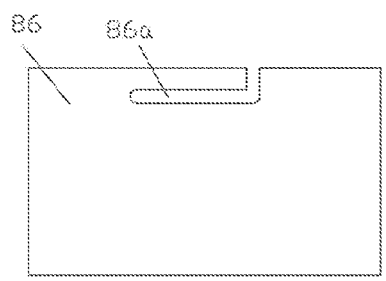
FIG. 17 is a left detail view of an embodiment of the present invention of the housing assembly partition.

FIG. 17 is a left detail of the housing assembly partition 86 showing the housing assembly partition relief 86a.

Figure 18:
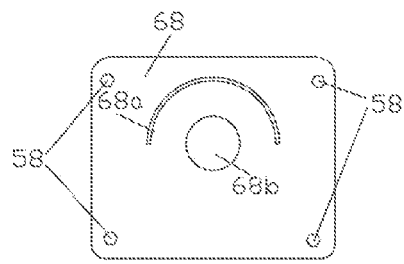
FIG. 18 is a front detail view of an embodiment of the present invention of the cleaner cover plate.

FIG. 18 is a front detail of the cleaner cover plate 68 showing the relative position of the safety guard 68a and the cleaner cover plate cutout 68b, which is of approximate size to pass over the quick release chuck 52 (FIG. 5) and the circular openings 58 which are located at opposing corners on the cleaner cover plate 68 which are of sufficient size to accommodate the retainer for cleaner cover plate 68 (FIG. 6).

In the operation of the present invention, the tubing preparation machine 300 is portable and easily transported to the work area by use of the housing cover handle 80 which is attached to the housing assembly cover 78, which is in turn attached to the housing assembly 31 by use of the latch 78a and the latch receiver 78b. Once the tubing preparation machine 300 is at the work location the latch 78a is disengaged from the latch receiver 78b, allowing the housing assembly cover 78 to be removed from the housing assembly 31 and set aside. The tubing preparation machine 300 is then attached to the appropriate power source, not shown. The tubing 54 that is to be cut is placed on the housing assembly top 82 and held firmly against the face of the tubing fence 24 with the operator's left hand, not shown. The top edge of the tubing fence 24 has been designed to angle toward the operator to increase the stability of the tubing 54 during the cutting process.

In the initial position of the cutting assembly, the operator's right hand grips the cutoff apparatus hand grip 26a and then actuates the cutoff motor control device 26b, which electrically energizes the cutoff motor 20, resulting in turning of the cutoff motor shaft 34. The cutoff motor shaft 34 which passes through the housing assembly partition 86 by way of the housing assembly partition relief 86a, allows for the unobstructed travel of the cutoff assembly 100 from its initial position to its most forward position during the cutting process, while at the same time the housing assembly partition 86 confines chips produced in the cutting process to be contained in the chip containment area 31d. The cutoff blade 22 is attached to the cutoff motor shaft 34 by use of the cutoff blade retainer 36. When the cutoff motor 20 is energized, the cutoff blade 22 is set into rotation. Once the cutoff blade 22 has reached its operating speed in revolutions per minute, then a forward pressure is applied with the operator's right hand, not shown, to the cutoff apparatus hand grip 26a, advancing the cutoff assembly 100 in a forward direction.

The cutoff assembly 100 then travels along the guide rail 30 by means of the guide rail sleeve 28a, affixed to the underside of the base plate 28. The cutoff assembly 100 moves in a precise and parallel alignment with the housing assembly top relief 82a and the guide rail 30 to the forward position engaging the tubing 54 and continuing through tubing 54 to the full forward position and severing the tubing 54. During the cutting process the cutoff blade guard 26 passes over the tubing 54 to be cut, while guarding the operator from the cutoff blade 22 and any chips being produced. Also during the cutting process the chip deflector 24a, which is attached to the back side of the tubing fence 24 and in direct alignment with the path of the cutoff blade 22, directs chips into the chip containment area 31d. Once the tubing 54 has been severed, the operator releases the cutoff motor control device 26b allowing the cutoff blade 22 to stop rotating. Once the cutoff blade 22 has stopped rotating, the operator applies a rearward pressure to the cutoff apparatus hand grip 26a returning the cutoff assembly 100 to its initial position. The cutting operation of the tubing 54 is then complete.

Once the tubing 54 has been cut the next step is to clean the exterior surface of the selected piece of tubing 54. The operator starts the cleaner assembly 200 by actuating the cleaner motor control device 72 to the ON position which electrically energizes the cleaner motor 38 turning the cleaner motor shaft 42. The cleaner motor 38 is attached to the housing assembly 31 by means of cleaner motor mount 40. The cleaner motor shaft 42 passes through the cleaner shaft support 44 which is attached to the cleaner mounting bracket 76, and is connected to the adaptor shaft 48, which in turn rotates the exterior tubing cleaner 50 and the quick release chuck 52. The operator grasps the selected piece of tubing 54 to be cleaned and inserts one end into the corresponding tubing alignment guide relief 62b of the tubing alignment guide 62 to the full depth of the tubing alignment guide relief 62b. The operator then rotates the grasped piece of tubing 54 in the opposite direction of the rotation of the exterior tubing cleaner 50 a minimum of one revolution of the tubing 54. The tubing 54 is then withdrawn from the tubing alignment guide 62 and the other end of the tubing 54 is cleaned in the same manner. Lengths of tubing 54 as short as twice the diameter of the tubing 54 can be cleaned.

Once all the desired pieces of tubing 54 are cleaned, the operator actuates the cleaner motor control device 72 to the OFF position deenergizing the cleaner motor 38 and bringing the cleaner assembly 200 to a stop. For cleaning the needed fittings, the operator can select the appropriate interior fitting cleaner 56 that corresponds to the size of the fitting to be cleaned. The interior fitting cleaner 56 is inserted into the quick release chuck 52. The operator then actuates the cleaner motor control device 72, which energizes the cleaner motor 38, which in turn rotates the interior fitting cleaner 56. While the interior fitting cleaner 56 is rotating the operator grasps the appropriate fitting, not shown, and slides the fitting over the interior fitting cleaner 56 to the full depth of the fitting socket. The fitting is momentarily held in that position and then removed from the interior fitting cleaner 56. Once all the desired fittings are cleaned, the operator actuates the cleaner motor control device 72 to the OFF position deenergizing the cleaner motor 38 and bringing the cleaner assembly 200 to a stop.

In the operation of the present invention a field adjustment may be made to maintain the required clearance between the tubing alignment guide 62 and the exterior tubing cleaner 50. This is accomplished by loosening each of the alignment guide retainer 64 which allows the tubing alignment guide 62 to move within the tubing alignment guide adjustment relief 62*a*, allowing the operator to make the necessary adjustments. Once the proper clearance is set, each alignment guide retainer 64 is tightened to hold the tubing alignment guide 62 in place. Occasionally, depending on the amount of usage of the cutoff assembly 100, the chip containment area 31*d* can be emptied of chips by loosening the chip cleanout cover 66 allowing the chips to be removed through the chip cleanout port 31*c*.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tubing preparation machine for cutting and cleaning of various size tubing and fittings, comprising:
   a) a housing assembly having a housing assembly top and a static tubing fence for fixedly mounting a tubing
   b) means for removably covering the housing assembly;
   c) a reciprocating cutting assembly comprising a rotating toothed cutting blade for cutting tubing, connected to said housing assembly, whereby said reciprocating cutting assembly and cutting blade move toward said static tubing fence to effect cutting of said tubing; and
   d) a plurality of unitary tubing alignment guides removably affixed to said housing assembly for accommodating and stabilizing tubing and fittings.

2. The tubing preparation machine in accordance with claim 1, wherein said means for removably covering the housing assembly comprises a housing assembly cover.

3. The tubing preparation machine in accordance with claim 1, further comprising means for removal of contaminants from the joining surface of tubing and fittings comprising a cleaner assembly, having a cleaner motor and a rotating exterior tubing and fitting cleaner and a rotating interior fitting cleaner.

4. A tubing preparation machine for cutting and cleaning of various size tubing and fittings, comprising:
   a) a housing assembly having a housing assembly top and a static tubing fence, for fixedly mounting a tubing;
   b) a removable housing assembly cover, for covering the housing assembly;
   c) a cutoff assembly, having a motor and a rotating toothed cutoff blade, for cutting of tubing, connected to said housing assembly, whereby said cutoff assembly and cutoff blade move toward said static tubing fence to effect cutting of said tubing; and
   d) a cleaner assembly, having a cleaner motor and a rotating exterior tubing and fitting cleaner and a rotating interior fitting cleaner, for removal of contaminants from the joining surface of tubing and fittings, removably affixed to said housing assembly.

5. The tubing preparation machine as recited in claim 4, wherein said rotating toothed cutoff blade, has external peripheral chamfer cutting teeth, for providing a smooth perpendicular cut through the tubing.

6. The tubing preparation machine as recited in claim 5, further comprising;
   e) a tubing alignment guide, for accepting and stabilizing various size tubing during cleaning.

7. The tubing preparation machine as recited in claim 6, further comprising;
   f) a concave relief, for allowing the placement of a plurality of tubing alignment guide reliefs.

8. The tubing preparation machine as recited in claim 5, further comprising;
   e) a concave relief, for allowing the placement of a plurality of tubing alignment guide reliefs.

9. The tubing preparation machine as recited in claim 4, further comprising;
   e) a unitary tubing alignment guide, for accepting and stabilizing various size tubing during cleaning.

10. The tubing preparation machine as recited in claim 9, further comprising;
    f) a concave relief, for allowing the placement of a plurality of tubing alignment guide reliefs.

11. The tubing preparation machine as recited in claim 4, further comprising;
    e) a concave relief, for allowing the placement of a plurality of tubing alignment guide reliefs.

12. A tubing preparation machine for cutting and cleaning various size tubing and fittings, comprising;
    a) a housing assembly, having a housing assembly top and a static tubing fence, for providing for the mounting and protection of components;
    b) a removable housing assembly cover, for covering the housing assembly;
    c) a reciprocating cutoff assembly, having a motor and a rotating toothed cutoff blade having external peripheral chamfer cutting teeth, for providing a smooth perpendicular cut through the tubing, connected to said housing assembly, whereby said reciprocating cutoff assembly and cutoff blade move toward said static tubing fence to effect cutting of said tubing;
    d) a cleaner assembly, having a cleaner motor and a rotating exterior tubing and fitting cleaner and a rotating interior fitting cleaner, for removal of contaminants from the joining surface of tubing and fittings, removably affixed to said housing assembly;
    e) a unitary tubing alignment guide, for accepting and stabilizing various size tubing during cleaning; and
    f) a concave relief, for allowing the placement of a plurality of tubing alignment guide reliefs.

\* \* \* \* \*